United States Patent
Xiao et al.

(10) Patent No.: US 8,426,986 B2
(45) Date of Patent: Apr. 23, 2013

(54) PHASE SEPARATED CURABLE COMPOSITIONS

(75) Inventors: Allison Yue Xiao, Belle Mead, NJ (US); Yayun Liu, Franklin Park, NJ (US)

(73) Assignee: Henkel Corporation, Rocky Hill, CT (US)

( * ) Notice: Subject to any disclaimer, the term of this patent is extended or adjusted under 35 U.S.C. 154(b) by 0 days.

(21) Appl. No.: 13/106,967

(22) Filed: May 13, 2011

(65) Prior Publication Data

US 2011/0210454 A1    Sep. 1, 2011

Related U.S. Application Data (63) Continuation of application No. PCT/US2009/065315, filed on Nov. 20, 2009.

(60) Provisional application No. 61/116,714, filed on Nov. 21, 2008.

(51) Int. Cl.
*H01L 23/28* (2006.01)
*H01L 23/29* (2006.01)
*H01L 23/58* (2006.01)
*B60C 1/00* (2006.01)
*C08F 8/30* (2006.01)
*C08F 4/44* (2006.01)
*C08F 4/72* (2006.01)

(52) U.S. Cl.
USPC ........... 257/787; 257/788; 257/798; 524/261; 524/265; 526/160; 526/170; 525/181; 525/184

(58) Field of Classification Search .......... 438/758–794, 438/800; 257/632–651, 678–733, 787–798, 257/E23.116–E23.119
See application file for complete search history.

(56) References Cited

U.S. PATENT DOCUMENTS

| | | | | |
|---|---|---|---|---|
| 4,521,567 A | * | 6/1985 | Arndt et al. ................ | 525/261 |
| 4,946,907 A | | 8/1990 | Kinloch et al. | |
| 4,990,587 A | * | 2/1991 | Shaw et al. ................ | 528/113 |
| 5,006,593 A | * | 4/1991 | Brasure et al. ............. | 524/520 |
| 6,525,157 B2 | | 2/2003 | Cozewith et al. | |
| 6,664,318 B1 | | 12/2003 | Bymark et al. | |
| 2002/0105093 A1 | * | 8/2002 | Papathomas ............. | 257/778 |
| 2005/0181216 A1 | * | 8/2005 | Nakanishi et al. ......... | 428/418 |
| 2007/0082203 A1 | * | 4/2007 | Canelas et al. ............ | 428/413 |
| 2007/0092733 A1 | * | 4/2007 | Yang et al. ................ | 428/413 |
| 2008/0268239 A1 | * | 10/2008 | Lesser et al. .............. | 428/338 |
| 2010/0084174 A1 | * | 4/2010 | Yamaguchi et al. ........ | 174/260 |

FOREIGN PATENT DOCUMENTS

| | | |
|---|---|---|
| CN | 1197098 A | 10/1998 |
| WO | 2007050404 A1 | 5/2007 |

OTHER PUBLICATIONS

Han, J. L., et al. "Interpenetrating Polymer Networks of Bismaleimide and Polyether Polyurethane-Crosslinked Epoxy," Journal of Applied Polymer Science, John Wiley & Sons, Inc., vol. 70, Dec. 12, 1998, pp. 2635-2645.

* cited by examiner

*Primary Examiner* — Fernando L Toledo
*Assistant Examiner* — Karen Kusumakar
(74) *Attorney, Agent, or Firm* — Jane E. Gennaro (57) ABSTRACT

A curable composition, suitable for underfill encapsulant, has two distinct phase domains after cure, a continuous phase and a discontinuous phase, in which one phase has a modulus value of 2 GPa or greater, and the second phase has a modulus value at least 1 Gpa less than the first phase, characterized in that the phases are generated in situ as the composition cures.

3 Claims, 3 Drawing Sheets

DMA of Example 1 Control and Sample1-c.

○ Tan delta of Example 1 control sample
● Tan delta of Sample 1-c
△ E' of Example 1 control sample
▲ E' of Sample 1-c Figure 1    DMA of Example 1 Control and Sample1-c.

PHASE SEPARATED CURABLE COMPOSITIONS

CROSS-REFERENCE TO RELATED APPLICATIONS

This application is a continuation of International Patent Application No. PCT/US2009/065315 filed Nov. 20, 2009, which claims the benefit of U.S. Provisional Patent Application No. 61/116,714 filed Nov. 21, 2008, the contents of which are incorporated herein by reference.

BACKGROUND OF THE INVENTION

This invention relates in general to curable compositions that cure into two phases or two polymer networks and that are suitable as encapsulant compositions. They have particular use in semiconductor packaging applications. This invention further relates to encapsulant compositions used in an assembly of a semiconductor die or semiconductor package (either hereinafter semiconductor) attached to a substrate in which a gap created between the semiconductor and the substrate is filled with the encapsulant composition. The first of the two separate phases or networks has a high modulus and the second has a low modulus phase.

In the manufacture of semiconductors, electrical connections are made between electrical terminals on the semiconductor and corresponding electrical terminals on the substrate for the semiconductor. One method for making these interconnections uses a metallic or polymeric solder applied to the terminals. The terminals are aligned and contacted together and the resulting assembly of semiconductor and substrate is heated to reflow the solder and solidify the connection. The space between the semiconductor and substrate created by the solder interconnections is filled with a polymeric encapsulant (underfill), which after deposition is cured. The cured encapsulant acts to reinforce the interconnect and to absorb stress associated with temperature cycling during further fabrication and ultimate operation of the device containing the semiconductor. The stress results from the disparate coefficients of thermal expansion (CTE) of the semiconductor and the substrate.

To be reliable for reinforcing the solder connections, the underfill encapsulant should have a high modulus value; the higher the modulus, the harder it is to deform that material and the higher the support of the solder interconnects. The encapsulant should also have a high glass transition temperature, $T_g$, when cured, at least as high as, or sufficiently close to, the ceiling temperature in any temperature cycling operation, so that it remains intact in order to protect the solder joints.

During the subsequent cooling of the semiconductor after reflow of the solder, warpage or deformation of the semiconductor may occur. A warped semiconductor is more difficult to attach to the next substrate. As die size and die number increase per semiconductor package, the problem becomes compounded. The use of Pb free solders also contributes to warpage because Pb free solders reflow at higher temperatures than Pb solders, and higher temperatures generate more warpage. A low modulus material would help to minimize warpage, as a low modulus material deforms easily and can absorb stress, but this is contrary to the requirement of high modulus for reliability of the underfill encapsulant.

The current solution to this problem is the addition of soft particles, such as core shell rubber to toughen the underfill material, or hard particles, such as silica, to lower the coefficient of thermal expansion of the underfill. However, using filler to manipulate the physical properties of underfill often involves a viscosity penalty and makes the composition unsuitable.

SUMMARY OF THE INVENTION

This invention is a curable composition, which upon curing generates two phases or two networks in situ, the first phase or network after cure having a modulus value of 2 GPa or greater and the second phase or network after cure having a modulus value at least 1 GPa less than the modulus value of the first phase or network.

The high modulus phase or network assures that the composition has sufficient strength for reliability; the low modulus phase or network assures sufficient flexibility for resistance to warpage. Either the high or the low modulus phase can be the continuous phase; the other will be the discontinuous phase.

The phases are generated in situ by either a reaction induced or a crystallization induced phase separation that occurs on curing. The networks are generated by components that cure independently of each other to form an interpenetrating polymer network.

DETAILED DESCRIPTION OF THE INVENTION

In one embodiment, the curable composition is prepared by blending two components, one of which will transition during cure to a phase having a modulus value of 2 GPa or greater, and the other of which will transition during cure to a phase having a modulus value at least 1 GPa lower than the first phase. For purposes of clarity, the phase having the high modulus value will be referred to herein as the first phase, and the phase having the lower modulus value will be referred to as the second phase. The phase transition temperatures for the two components should be chosen to be separate and distinct from each other. A phase transition temperature is the temperature at which there is a phase change in a material; for example, a change from a brittle solid to a rubbery solid, from a solid to a liquid, or from a liquid to a solid. Phase transition temperatures and modulus values for known materials have been recorded in handbooks of physical constants and are determinable from such references. It is possible, then, to compose a composition from components, which, during cure, will transition into two separate phases. The component present in the higher percentage will form the continuous phase or matrix; the component present in the lower percentage will form the discontinuous phase, or domain.

The phases are produced in situ by either a reaction-induced phase separation (RIPS), or a crystallization-induced phase separation (CIPS).

A reaction-induced phase separation occurs upon the separation into two distinct phases of an initially homogeneous solution. The initially homogeneous solution contains both the monomers for polymerization into the high modulus phase and the materials for the low modulus phase. As the polymerization of the monomers for the high modulus phase progresses and a polymer with advancing molecular weight is formed, the phases separate.

A crystallization-induced phase separation occurs upon the crystallization of one or more of the components from liquid starting materials (which includes solid materials in solution), resulting in a solid crystalline phase within a (liquid) amorphous phase.

An interpenetrating polymer network is formed from a composition comprising two or more components that polymerize independently and form two or more polymer networks that are at least partially interlaced on a molecular scale, but that are not covalently bonded to each other and cannot be separated unless chemical bonds are broken. Each independent polymer network will have a distinct and separate modulus from the other within the interpenetrating polymer network. Thus, there will be a polymer component with a modulus at one value, and a polymer component with a modulus at a higher or lower value than the first.

The starting chemical materials for forming the component that will have a high modulus value are, in general, thermosetting monomers selected from the group consisting of epoxies, cyanate esters, maleimides, acrylates, oxetanes, benzoxazines, bisoxazolines, and crystalline and liquid crystalline materials;

Suitable epoxy resins to form the high modulus phase include bisphenol epoxies, naphthalenes, and aliphatic type epoxies. Commercially available materials include bisphenol type epoxy resins (Epiclon 830LVP, 830CRP, 835LV, 850CRP) available from Dainippon Ink & Chemicals, Inc.; naphthalene type epoxy (Epiclon HP4032) available from Dainippon Ink & Chemicals, Inc. Other suitable epoxy resins include cycloaliphatic epoxy resins, bisphenol-A type epoxy resins, bisphenol-F type epoxy resins, epoxy novolac resins, biphenyl type epoxy resins, naphthalene type epoxy resins, dicyclopentadiene-phenol type epoxy resins, reactive epoxy diluents, and mixtures thereof.

Suitable cyanate ester resins to form the high modulus phase include those having the generic structure in which n is 1 or larger, and $X^7$ is a hydrocarbon group. Exemplary $X^7$ entities include bisphenol, phenol or cresol novolac, dicyclopentadiene, polybutadiene, polycarbonate, polyurethane, polyether, or polyester. Commercially available materials include; AroCy L-10, AroCy XU366, AroCy XU371, AroCy XU378, XU71787.02L, and XU 71787.07L, available from Huntsman LLC; Primaset PT30, Primaset PT30 S75, Primaset PT60, Primaset PT60S, Primaset BADCY, Primaset DA230S, Primaset MethylCy, and Primaset LECY, available from Lonza Group Limited; 2-allyphenol cyanate ester, 4-methoxyphenol cyanate ester, 2,2-bis(4-cyanatophenol)-1,1,1,3,3,3-hexafluoropropane, bisphenol A cyanate ester, diallylbisphenol A cyanate ester, 4-phenylphenol cyanate ester, 1,1,1-tris(4-cyanatophenyl)ethane, 4-cumylphenol cyanate ester, 1,1-bis(4-cyanateophenyl)ethane, and 4,4'-bisphenol cyanate ester, available from Oakwood Products, Inc.

Exemplary solid aromatic bismaleimide (BMI) resin powders to form the high modulus phase are those having the structure in which X is an aromatic group. Bismaleimide resins having these X bridging groups are commercially available, and can be obtained, for example, from Sartomer (USA), HOS-Technic GmbH (Austria), or Flexys (for example PERKALINK 900).

Additional exemplary maleimide resins to form the high modulus phase include those having the generic structure in which n is 1 to 3 and $X^1$ is an aliphatic or aromatic group. Exemplary $X^1$ entities include, poly(butadienes), poly(carbonates), poly(urethanes), poly(ethers), poly(esters), simple hydrocarbons, and simple hydrocarbons containing functionalities such as carbonyl, carboxyl, amide, carbamate, urea, or ether. These types of resins are commercially available and can be obtained, for example, from National Starch and Chemical Company and Dainippon Ink and Chemical, Inc.

Additional maleimide resins include

Suitable acrylate resins for use in the high modulus phase include those having the generic structure in which n is 1 to 6, $R^1$ is —H or —$CH_3$, and $X^2$ is an aromatic or aliphatic group. Exemplary $X^2$ entities include poly(butadienes), poly(carbonates), poly(urethanes), poly(ethers), poly(esters), simple hydrocarbons, and simple hydrocarbons containing functionalities such as carbonyl, carboxyl, amide, carbamate, urea, or ether.

Exemplary liquid crystalline materials include materials formed from monomers with epoxy, acrylate, acid or diol functionalities, such as, N,N'-bis[4-(2,3-epoxy propoxy phenylene-iminomethyl)]-2,2-dimethyl biphenylene (BMPE)

With respect to RIPS and CIPS, the starting chemical materials for forming the component that will transition during cure into the phase having a low modulus value are, in general, any monomers, oligomers, block copolymers, elastomers, or mixtures thereof, particularly thermoplastic materials, that polymerize independently from the monomers used to form the high modulus phase. That is, materials suitable for use to form the low modulus phase can be of any chemistry that has limited compatibility (not easily miscible) with the polymerized first phase. Particular examples include those oligomers sold under the tradename PRIPLAST 2101, 2102, 2103, and 2104, from Croda, New Castle, Del., which are the reaction product of dimer acid and a polyol.

With respect to the IPN, the starting materials consist of two or more different types of monomers that can polymerize independently. The starting materials will be chosen so that one polymer network will have a modulus of 2 GPa or greater and a Tg higher than the other network, and the other network will have a modulus at least 1 GPA lower than the first polymer network and a Tg lower than the first network. Suitable low modulus producing monomers include bismaleimides, acrylates, and epoxies. In one embodiment, the IPN curable composition will comprise epoxy resin as one of the components and the other component will be selected from the group consisting of bismaleimide, acrylate, methacrylate and combinations thereof.

Examples of bismaleimides include those having the structures:

and

Examples of acrylates include lauryl acrylate, lauryl methacrylate, poly(butadiene) with acrylate functionality and poly(butadiene) with methacrylate functionality, 1,9-nonandiol diacrylate, 1,9-nonandiol dimethacrylate, 1,10-nonandiol diacrylate, and 1,10 decandiol di(meth)acrylate.

Examples of epoxies include those having the structures:

and

-continued in which $C_{34}$ represents a 34 carbon chain, which may contain cyclic moieties.

In addition to the materials used to form the high modulus and low modulus phases, the composition may also comprise one or more catalysts, one or more fillers, adhesion promoters and wetting agents. Such materials and the amounts to be used are known to those skilled in the art without undue experimentation.

In a further embodiment, this invention is an assembly of a semiconductor and a substrate in which a gap existing between the semiconductor and the substrate is filled with a cured encapsulant composition comprising two phases, the first phase having a modulus value of 2 GPa or greater and the second phase having a modulus value at least 1 Gpa less than the modulus value of the first phase, characterized in that the phases were generated in situ as the encapsulant composition cured.

EXAMPLES

Example 1

Preparation and Performance of Reaction Induced Phase Separation Systems: a Low Modulus Phase Domain in a High Modulus Phase Matrix To produce reaction induced phase separation systems (RIPS), various compositions containing cyanate ester and epoxy as high modulus components, and oligoesters as low modulus components, were prepared in components and weight percent as shown in TABLE 1-A.

TABLE 1-A

| | | RIPS formulations | | | | | |
|---|---|---|---|---|---|---|---|
| | | Control-1 | 1-a | 1-b | 1-c | 1-d | 1-e |
| High modulus components | cyanate ester | 55.8% | 44.4% | 44.4% | 50.0% | 50.0% | 30% |
| | bis F epoxy | 37.2% | 9.7% | 9.7% | 23.3% | 23.3% | 14% |
| | DDS | 7% | 5.6% | 5.6% | 6.3% | 6.3% | 3.8% |
| Filler | SiO$_2$ | 0 | 0 | | 0 | 0 | 39.9% |
| Low modulus components | oligoester A | | 39.8% | | 19.9% | | |
| | oligoester B | | | 39.8% | | 19.9% | 12.0% |
| | acrylate copolymer | | 0.5% | 0.5% | 0.5% | 0.5% | 0.3% |

Notes:
cyanate ester is 4,4'ethylidene-diphenyl dicyanate, obtained from the Lonza Group under the tradename LECY; bis F epoxy was obtained from National Starch and Chemical Company; DDS is 3,3'-diaminodiphenyl sulfone, obtained from Sigma Aldrich; acrylate copolymer was obtained under the tradename MODAFLOW AQ-3000 from Cytec Surface Specialties.

The oligoesters A and B were prepared in house from various polyols of dimerized fatty acids (sold by Uniqema), 1,6-hexanediol (sold by Sigma Aldrich). and adipic acid (sold by Sigma Aldrich). The polyols of dimerized fatty acid were sold under the trade names PRIPOL 1009, having a trimer level of 1%, and PRIPOL 1017, having a trimer level of 20%.

The polyols of dimerized fatty acid, hexanediol and adipic acid were charged to a 500 ml round bottomed flask fitted with an electric stirrer, nitrogen inlet, thermocouple and condenser with a distillation take off arm. The components were heated to 150° C., during which time the water of reaction was removed. The contents of the flask where held at 150° C. for four hours. The reaction temperature was then increased to 160° C., 170° C., 180° C., and 190° C., and held at each temperature for 30 minutes, then to 200° C. and held at that temperature for 60 minutes. The reaction temperature was finally increased to 220° C., and held at this temperature until the acid value of the material matched the predicted acid value for the particular molecular weight, previously calculated, indicating that the product was 100% COOH terminated. The acid terminated product was cooled slightly and converted to the ester with glycidol. The components in parts by weight for the oligoesters, ending molecular weight (weight average Mw) and acid number are reported in TABLE 1-B.

TABLE 1-B

|  | PRIPOL 1009 | PRIPOL 1017 | Adipic Acid | Hexane Diol | Mol wt | Acid Number mg KOH/gm |
|---|---|---|---|---|---|---|
| Oligoester A | — | 100 | 100 | 86 | 4000 | 56 |
| Oligoester B (high polar) | 100 | — | 100 | 84.5 | 4000 | 63 |

The components for forming the high modulus and low modulus phases (shown in TABLE 1-A) were mixed using a Flacktek Speed Mixer (model DAC 150 SP) and processed in three sequential 60 second mixing cycles at 3000 rpm with 120 seconds of rest between cycles. Sample 1E contained filler at 40% by weight, and was mixed as the unfilled samples except that 3 mm glass or zirconia milling media was used. The mixtures, filled and unfilled, were degassed under vacuum, cast into a silicone mold and heated at 165° C. for 90 minutes to cure.

The cured compositions were examined using a Scanning Electron Microscope (SEM) with an accelerating voltage of 20 kV. An oligoester rich phase was clearly observed in both filled and non-filled formulations.

The cured compositions were analyzed by Dynamic Mechanical Thermal Analysis using TA RSA III solid analyzer with a dual cantilever configuration, a ramp profile from −50° C. to 260° C. at a ramp rate of 5° C./min. The frequency was 10.0 rads and strain was set at 0.1%. The results disclosed a below zero phase transition of continuous/discontinuous material as well as Tg>160° C. The modulus for the Control and Sample 1-c are set out in TABLE 1-C

TABLE 1-C

|  | Transition temperature (peak tan delta) C. | Modulus at −50° C. GPa | Modulus at −25° C. GPa | Modulus at 125° C. GPa | Modulus at 165° C. GPa |
|---|---|---|---|---|---|
| Control for Ex. 1 |  | 190.42 | 6.95 | 5.13 | 3.22 | 2.034 |
| Sample 1-c | −12.12 | 191.57 | 6.48 | 3.10 | 1.40 | 2.43 |

Example 2

Preparation and Performance of Interpenetrating Polymer Network (IPN): an Interlaced Low Modulus Network with a High Modulus Network

To produce interpenetrating polymer network systems (IPN), two compositions containing an epoxy as the high modulus component, and a bismaleimide as the low modulus component, were prepared in components and weight percent as shown in TABLE 2.

TABLE 2

IPN formulations

|  |  | Control Epoxy | Control BMI | 2A | 2B |
|---|---|---|---|---|---|
| High modulus components | bis F epoxy | 95.0% |  | 45.0% | 49.5% |
|  | Rhodorsil 2074 | 5% |  | 4.5% | 4.5% |
| Low modulus components | dicumyl peroxide |  | 2.0% | 1.0% | 1.0% |
|  | bismaleimide |  | 98.0% | 45.0% | 45.0% |
|  | 4 hydroxybutyl acrylate glycidyl ether |  |  | 4.5% |  |

Figure 1:
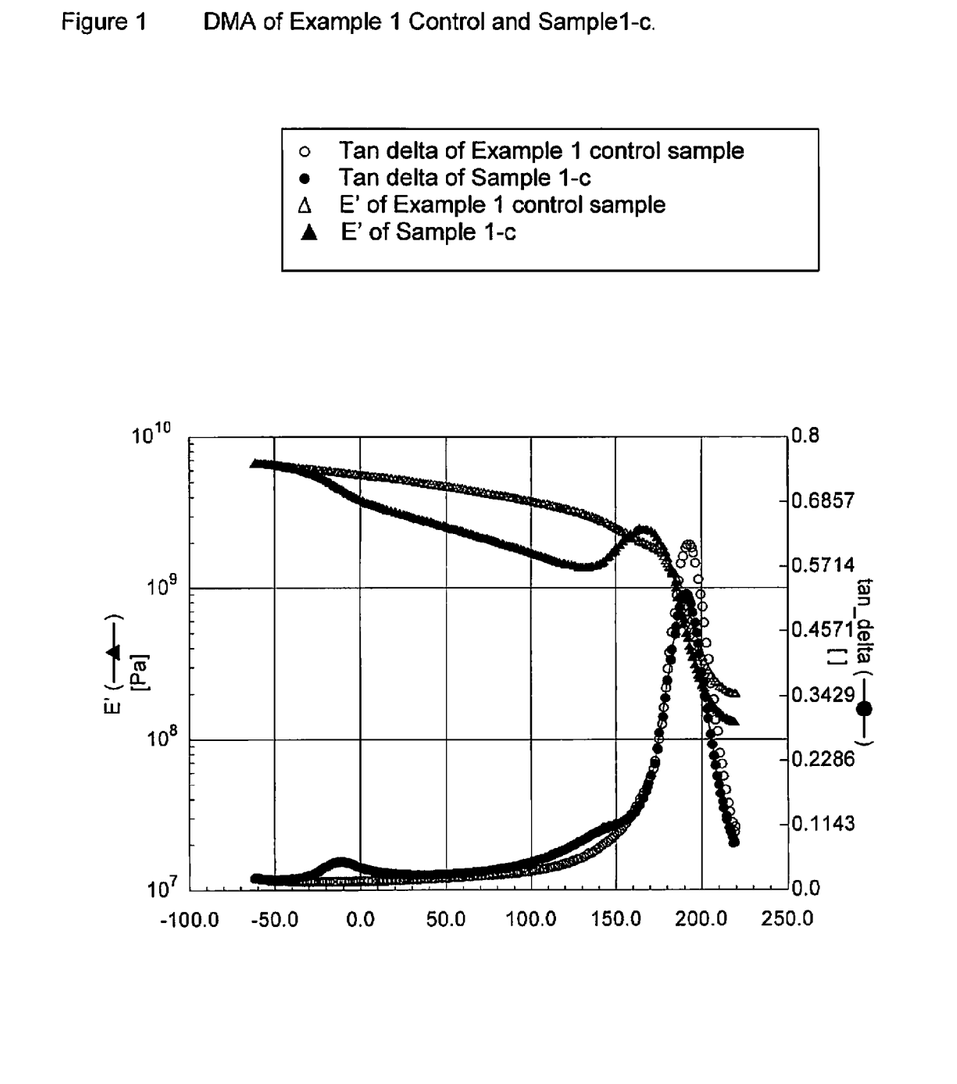
FIG. 1 is a graph of the tan delta and E' values for the samples in Example 1.
Figure 2A:
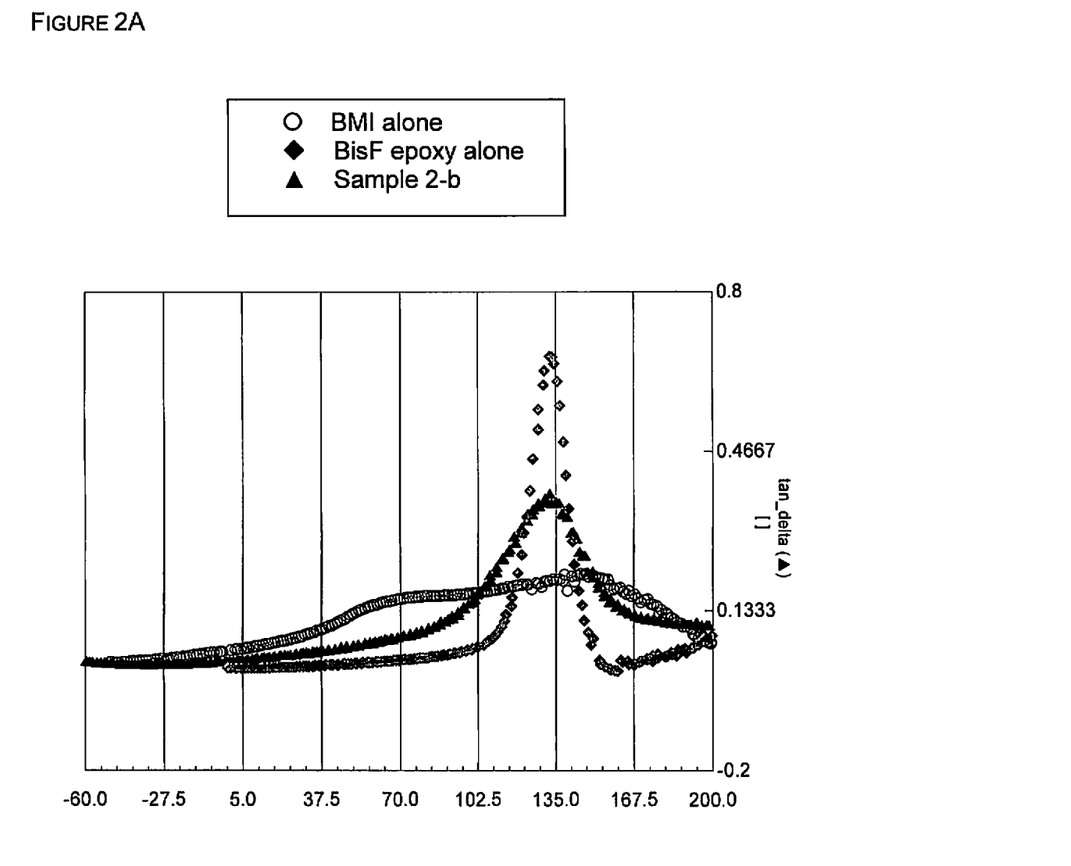
FIGS. 2A AND 2B are graphs of the tan delta values for the samples in Example 2.
Figure 2B:
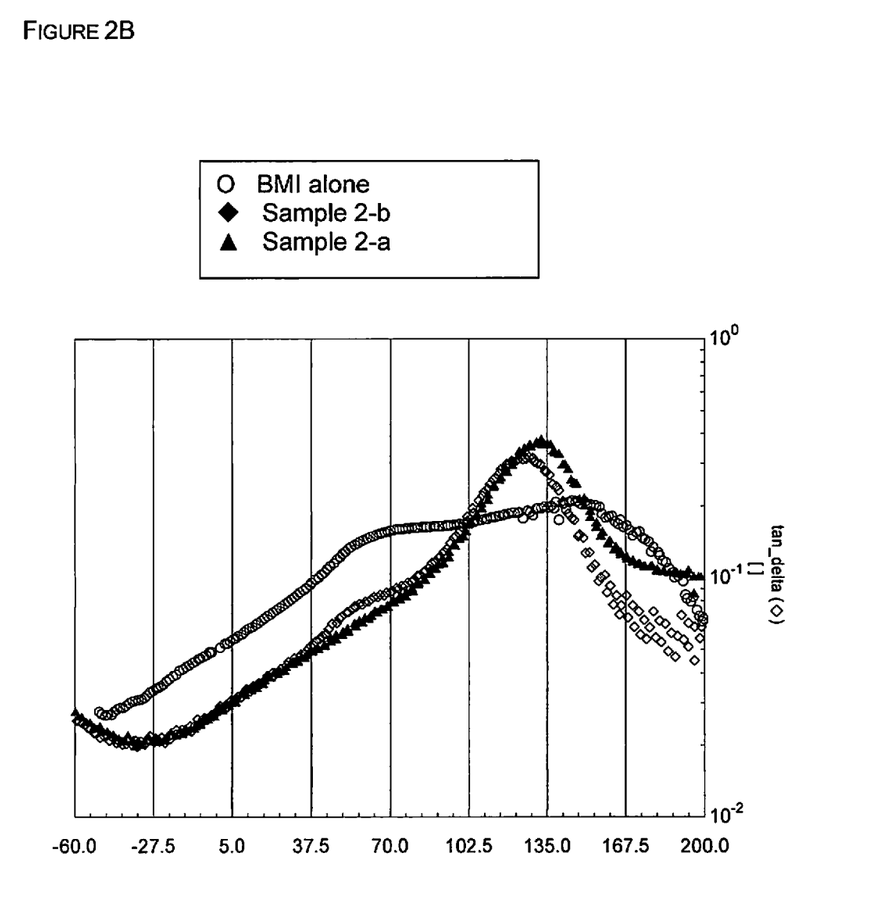

Notes: Bis F epoxy was obtained from National Starch and Chemical Company as product 74-4573; initiator is p-isopropylphenyl)(p-methylphenyl)iodonium tetrakis(pentafluorophenyl)borate (Rhodorsil Photo initiator 2074 from Rhodia); bismaleimide is a proprietary resin having the structural formula The samples were prepared and cured as in Example 1. A composition of epoxy and initiator, and a composition of bismaleimide and initiator, were likewise cured and used as controls. The cured samples were analyzed with Dynamic Mechanical Thermal Analysis using TA RSA III solid analyzer with a dual cantilever configuration, a ramp profile from −50° C. to 260° C. at a ramp rate of 5° C./min. The frequency was 10.0 rad/s and strain was set at 0.1%. The results are disclosed in FIGS. 2A and 2B in graphic format. The graphs show that the tan delta values of the epoxy control formulation indicate a high Tg; the tan delta values of the bismaleimide control formulation indicate a low Tg; and the tan delta values for sample 2-b show two distinct Tgs, each Tg being very close to the Tg of the homopolymer of the bismaleimide and the homopolymer of the bis F epoxy. These results indicate an IPN structure with two Tgs for two distinct polymer networks that are not covalently bonded.

Example 3

Preparation and Performance of Reaction Induced Phase Separation Systems (RIPS): a Low Modulus Phase Domain in a High Modulus Phase Matrix To produce reaction induced phase separation systems (RIPS), two compositions containing an epoxy as the high modulus component, and oligoester B as the low modulus component, were prepared in components and weight percent as shown in TABLE 3.

TABLE 3

RIPS formulations

|  |  | Control-3 | 3-a |
|---|---|---|---|
| High modulus component | bis F epoxy | 95.0% | 63.1% |
|  | 2-phenyl-4-methyl imidazole | 5% | 3.2% |
| Low modulus component | oligoester B |  | 33.7% |

Note.
Bis F epoxy was obtained as product 78-4573 from National Starch and Chemical Company.

The samples were prepared and cured as in Example 1. The cured samples were analyzed by Dynamic Mechanical Thermal Analysis using TA RSA III solid analyzer with a dual cantilever configuration, a ramp profile from −100° C. to 260° C. at a ramp rate of 5° C./min. The frequency was 10.0 rad/s and strain was set at 0.1%. The results disclosed the evidence of two phase morphology. The secondary phase transition of oligoester phase was observed on tan delta curve at −60° C. region. The Tg of the epoxy matrix was not affected compared to the Control-3 sample.

Example 4

Preparation and Performance of Crystallization Induced Phase Separation Systems (CIPS)

To produce crystallization induced phase separation systems (CIPS), two compositions containing cyanate ester as the high modulus component, and N,N'-bis[4-(2,3-epoxy propoxy phenylene-iminomethyl)]-2,2-dimethyl biphenylene (BMPE) as the low modulus component, were prepared in components and weight percent as shown in TABLE 4.

TABLE 4

CIPS formulations

|  |  | Control | 4-a | 4-b |
|---|---|---|---|---|
| High modulus components | cyanate ester | 99.95% | 49.98% | 39.98% |
|  | Cu acetoacetonate | 0.05% | 0.04% | 0.04% |
| Low modulus components | BMPE |  | 49.98% | 59.97% |

Notes:
cyanate ester, 4,4'ethylidene-diphenyl dicyanate, was obtained from the Lonza Group;
Cu acetoacetonate was obtained from Sigma Aldrich;
BMPE was synthesized on request by Fudan University, China, and has the following structure:

Cu acetoacetonate was first dispersed in cyanate ester (2% by weight of total formulation) at 100° C. and set aside. BMPE was melted and the remainder of the cyanate ester was mixed into the BMPE in a speed mixer for 60 secs at 3000 rpm. Then the CuAcAc dispersed in cyanate ester was added.

The uncured CIPS samples were disposed between a glass slide and a cover glass to a thickness of less than 50 μm and cured at 190° C. for three hours. The cured samples were examined by Optical Microscopy using a Nikon instrument with polarized light and disclosed a clear separated domain of size 5-10 microns with ordered structure. The cured samples were examined also by Dynamic Mechanical Thermal Analysis using TA RSA III solid analyzer with a dual cantilever configuration, a ramp profile from −50° C. to 260° C. at a ramp rate of 5° C./minute. The frequency was 10.0 rad/second and strain was set at 0.1%. This analysis indicated that the E' modulus of the crystallized BMPE containing samples was not changed below the glass transition temperature region. The modulus after glass transition was much higher than that of the control sample, indicating the crystalline phase was sustained through glass transition of the main matrix material. The increase E' modulus after Tg can improve the solder reliability without increasing warpage.

Example 5

Test for Warpage

Test vehicles were semiconductor assemblies prepared from 15×15 mm semiconductor dies bumped with lead free solders and a 42×42 mm BT substrate. The die and BT substrate were joined by contacting the solder on the die with corresponding terminals on the substrate and then reflowing the solder. The assembly of die and substrate were heated in 165° C. oven for two hours to remove any absorbed moisture. Then a composition from one of the prior examples was dispensed as an underfill encapsulant into the gap between the die and the substrate (underfilling). The assemblies were held at 110° C. during underfilling. The compositions were dispensed from a syringe with 0.33 mm needle by hand along one side of the die. The composition filled the gap by capillary action (underfilled the assembly), and was then cured at 165° C. for 90 minutes to form a finished semiconductor assembly.

Warpage was measured as the average of the distance two diagonal lines along the underside of the substrate curved from the horizontal plane on which the substrate rested. Measurements were made using a laser profilometer (Cobra 3D, Optical Gaging Product). Warpage measurements were taken before underfilling and immediately after the cured packages were cooled to 25° C. The warpage increase after cure was used to compare the effect of underfill on warpage. The results are reported in TABLE 5.

TABLE 5

|  | Warpage(μm) |
|---|---|
| Control Sample for Ex. 1 | 58 |
| Sample 1-d | 43 |
| % less warpage for 1-d | 25% |
| Control Epoxy Sample for Ex. 2 | 151.4 |
| Sample 2-a | 99.7 |
| % less warpage for 2-a | 50% |
| Control Sample for Ex. 3 | 120.5 |
| Sample 3-a | 60.4 |
| % less warpage for 3-a | 50% |

This example shows that the presence of the two phase underfill encapsulant as described herein significantly reduced warpage compared to a control underfill encapsulant that did not comprise the two phases.

What is claimed:

1. A curable composition, which upon curing generates two phases in situ, the first phase comprising cyanate ester resin or an epoxy resin or both, the first phase after cure having a modulus value of 2 GPa or greater and the second phase comprising an oligomeric material having a weight average molecular weight in the range of 500 to 5000, a maleimide, a cyanate ester resin, an epoxy resin, or both a cyanate ester resin and an epoxy resin, the second phase after cure having a modulus value at least 1 Gpa less than the modulus value of the first phase after cure.

2. A cured composition comprising two phases generated in situ, in which the first phase comprises cyanate ester resin or an epoxy resin or both and has a modulus value of 2 GPa or greater and the second phase comprises an oligomeric material having a weight average molecular weight in the range of 500 to 5000, a maleimide, a cyanate ester resin, an epoxy resin or both a cyanate ester resin and an epoxy resin and has a modulus value at least 1 GPa less than the modulus value of the first phase.

3. The cured composition according to claim 2 in which the phases are generated in situ by reaction induced phase separation or by crystallization induced phase separation.

* * * * *